United States Patent
Kaneuchi

(10) Patent No.: US 11,327,243 B2
(45) Date of Patent: May 10, 2022

(54) OPTICAL CONNECTION COMPONENT WITH ELASTIC SECURING MEMBER

(71) Applicant: SUMITOMO ELECTRIC INDUSTRIES, LTD., Osaka (JP)

(72) Inventor: Yasuomi Kaneuchi, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/146,624

(22) Filed: Jan. 12, 2021

(65) Prior Publication Data
US 2021/0132296 A1 May 6, 2021

Related U.S. Application Data
(63) Continuation of application No. PCT/JP2019/031000, filed on Aug. 6, 2019.

(30) Foreign Application Priority Data
Aug. 9, 2018 (JP) .............................. JP2018-149962

(51) Int. Cl.
*G02B 6/38* (2006.01)
*G02B 6/36* (2006.01)
*G02B 6/40* (2006.01)

(52) U.S. Cl.
CPC ......... *G02B 6/3839* (2013.01); *G02B 6/3628* (2013.01); *G02B 6/3885* (2013.01); *G02B 6/40* (2013.01)

(58) Field of Classification Search
CPC .. G02B 6/3839; G02B 6/3628; G02B 6/3885; G02B 6/40; G02B 6/4249; G02B 6/4292;
(Continued)

(56) References Cited

U.S. PATENT DOCUMENTS 5,037,179 A * 8/1991 Bortolin ............... G02B 6/3885
                                                              385/54
5,102,212 A * 4/1992 Patterson ............. G02B 6/3801
                                                              385/98
(Continued)

FOREIGN PATENT DOCUMENTS

JP    S62-19814 A    1/1987
JP    H03-49507 U    5/1991
(Continued)

*Primary Examiner* — Andrew Jordan
(74) *Attorney, Agent, or Firm* — Oliff PLC

(57) ABSTRACT

An optical connection component includes optical fibers; one or a plurality of line members arranged in parallel with the optical fibers, line members having a lower elastic limit and being easier to undergo plastic deformation at room temperature than the optical fibers; a first securing member as a block having a plurality of capillaries extending parallel to one another or as a combination of a V-grooved board and a flat board, the V-grooved board having a plurality of V-grooves extending parallel to one another, the first securing member securing one-end portions of the optical fibers and one-end portions of the one or plurality of line members individually in the plurality of capillaries or in the plurality of V-grooves; and a second securing member that secures the optical fibers and the one or plurality of line members on a side near other-end portions of the one or plurality of line members.

6 Claims, 4 Drawing Sheets

(58) Field of Classification Search
CPC .. G02B 6/3829; G02B 6/3644; G02B 6/3861;
G02B 6/43
See application file for complete search history.

(56) References Cited

U.S. PATENT DOCUMENTS

| | | | |
|---|---|---|---|
| 5,257,334 | A | 10/1993 | Takahashi |
| 6,275,633 | B1 | 8/2001 | Lei |
| 9,529,167 | B2 * | 12/2016 | Wu .................. G02B 6/3817 |
| 2010/0232743 | A1 | 9/2010 | Ishikawa et al. |
| 2015/0346448 | A1 | 12/2015 | Wu |
| 2021/0132296 | A1 * | 5/2021 | Kaneuchi ............ G02B 6/3628 |

FOREIGN PATENT DOCUMENTS

| | | | |
|---|---|---|---|
| JP | H05-119237 A | 5/1993 | |
| JP | 2007-156006 A | 6/2007 | |
| JP | 2008-52028 A | 3/2008 | |
| JP | 2015-228016 A | 12/2015 | |

* cited by examiner

OPTICAL CONNECTION COMPONENT WITH ELASTIC SECURING MEMBER

CROSS REFERENCE TO RELATED APPLICATION

This application is a continuation of International Application NO. PCT/JP2019/031000, filed Aug. 6, 2019, which claims the priority of Japanese Patent Application No. 2018-149962, filed Aug. 9, 2018, the entirety of which is incorporated herein by reference.

BACKGROUND OF THE INVENTION

Technical Field

The present disclosure relates to an optical connection component.

Background Art

With the reduction in the sizes of optical modules, optical connection components are desired to have a shorter height than ever for a reduction in the overall height of a set of optical fibers from a board on which optical devices, such as a light-emitting device; a light-receiving device; and an optical circuit, are to be mounted, the overall height occurring in perpendicular face-to-face connection of one end of each of the optical fibers to the board. To shorten the height of such an optical connection component, a portion of the optical fiber that is near the end needs to be bent with a small radius. Therefore, an optical-path-conversion member is disclosed by JP2008-52028A that includes the following: a base board having a curved end face smoothly continuous with a flat upper surface thereof, the base board having a plurality of positioning grooves arranged on the top face thereof; and a lid member for retaining optical fibers to be fitted in the positioning grooves of the base board, the lid member having a surface extending along the top face of the base board. On the other hand, an optical connector is disclosed by JP2007-156006A that includes a connector body having a curved hole, where an optical fiber is to be inserted and secured, whereby the optical fiber is bent.

SUMMARY OF THE INVENTION

An optical connection component according to an embodiment of the present disclosure includes an optical fiber; one or a plurality of line members arranged in parallel with the optical fiber, the one or plurality of line members having a lower elastic limit and being easier to undergo plastic deformation at room temperature than the optical fiber; a first securing member as a block having a plurality of capillaries extending parallel to one another or as a combination of a V-grooved board and a flat board, the V-grooved board having a plurality of V-grooves extending parallel to one another, the first securing member securing a one-end portion of the optical fiber and one-end portions of the one or plurality of line members individually in the plurality of capillaries or in the plurality of V-grooves; and a second securing member that secures the optical fiber and the one or plurality of line members on a side near other-end portions of the one or plurality of line members.

DESCRIPTION OF THE EMBODIMENTS

Figure 1:
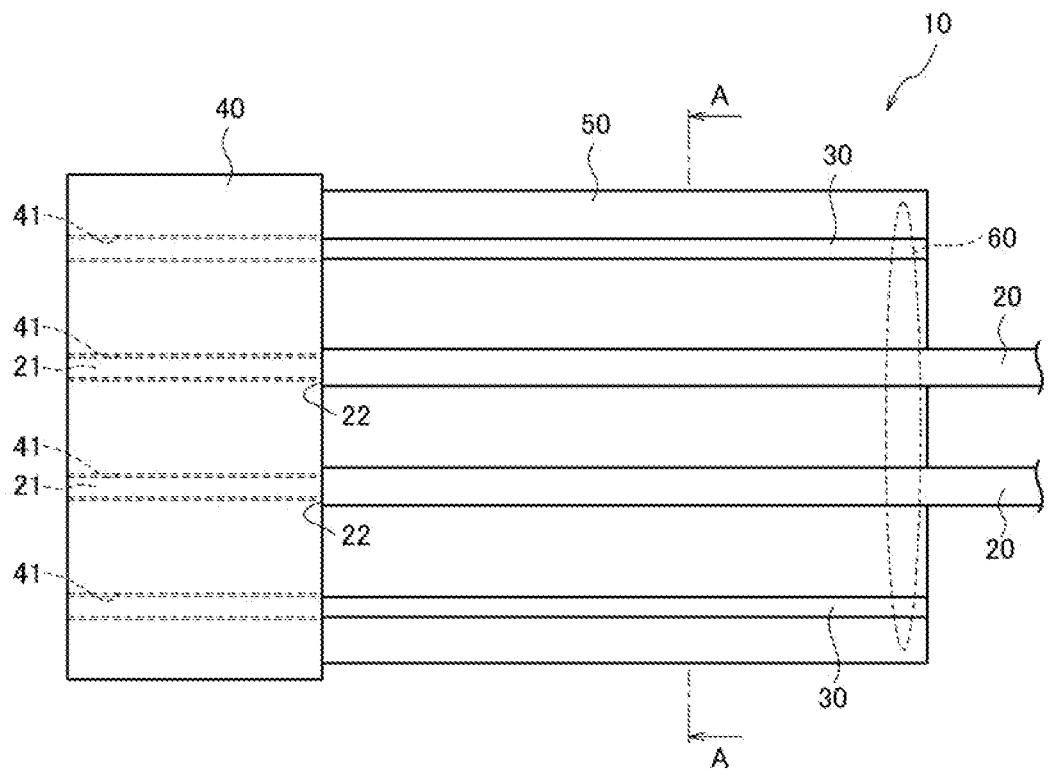
FIG. 1 is a plan view of an exemplary optical connection component according to the present disclosure.

To bend an optical fiber with a desired radius or at a desired angle by using the optical-path-conversion member disclosed by JP2008-52028A or the optical connector disclosed by JP2007-156006A, the board having a predetermined curved surface or the member having the curved hole is necessary. Moreover, to change the curvature of the optical fiber, such a member needs to be changed.

The present disclosure has been conceived in view of the above circumstances and is to provide an optical connection component capable of retaining an optical fiber that is bent with a desired curvature, with neither a board having a predetermined curved surface nor a member having a curved hole.

According to the present disclosure, an optical connection component capable of retaining an optical fiber that is bent with a desired curvature can be obtained, with neither a board having a predetermined curved surface nor a member having a curved hole.

First, embodiments of the present disclosure will be described in order. An optical connection component according to an embodiment of the present disclosure includes an optical fiber; one or a plurality of line members arranged in parallel with the optical fiber, the one or plurality of line members having a lower elastic limit and being easier to undergo plastic deformation at room temperature than the optical fiber; a first securing member as a block having a plurality of capillaries extending parallel to one another or as a combination of a V-grooved board and a flat board, the V-grooved board having a plurality of V-grooves extending parallel to one another, the first securing member securing a one-end portion of the optical fiber and one-end portions of the one or plurality of line members individually in the plurality of capillaries or in the plurality of V-grooves; and a second securing member that secures the optical fiber and the one or plurality of line members on a side near other-end portions of the one or plurality of line members. In the present disclosure, "room temperature" ranges from 5° C. to 35° C.

In such a configuration, when the one or plurality of line members are bent and plastically deformed, the optical fiber secured to the second securing member together with the one or plurality of line members can be retained in the bent state. Thus, an optical connection component capable of retaining an optical fiber that is bent with a desired curvature can be obtained, with neither a board having a predetermined curved surface nor a member having a curved hole.

The second securing member may adhesively secure the optical fiber and the one or plurality of line members on the side near the other-end portions of the one or plurality of line members. In such a configuration, the optical fiber can be freed between the side near the other-end portions of the one or plurality of line members and the first securing member.

The one or plurality of line members may include two line members, and the optical fiber may be positioned between the two line members. In such a configuration, the force of retaining the bends in the two line members can be transmitted assuredly to the optical fiber through the second securing member. Thus, the optical fiber can be retained firmly in the bent state.

The second securing member may be a plate member that spreads over a plane of parallel arrangement of the optical fiber and the two line members and is plastically deformable together with the two line members. In such a configuration, not only the two line members but also the plate member undergoes plastic deformation. Therefore, the force of retaining the bends in the line members and in the plate member can be transmitted assuredly to the optical fiber through the second securing member. Thus, the optical fiber can be retained firmly in the bent state.

The plate member may be secured to the first securing member or to the one-end portions of the optical fiber and the two line members. In such a configuration, the force of retaining the bends in the two line members can be transmitted assuredly to the optical fiber through the second securing member. Thus, the optical fiber can be retained firmly in the bent state.

The second securing member is a block having a plurality of second capillaries extending parallel to one another or a combination of a V-grooved board and a flat board, the V-grooved board having a plurality of second V-grooves extending parallel to one another, the second securing member securing an other-end portion of the optical fiber and the other-end portions of the one or plurality of line members individually in the plurality of second capillaries or in the plurality of second V-grooves. In such a configuration, the necessity of separately preparing a plate member as the second securing member is omitted.

Preferable embodiments of the optical connection component according to the present disclosure will now be described with reference to the drawings. In the following description, elements denoted by the same reference numerals in different drawings are regarded as being the same, and redundant description of such elements may be omitted. The present invention is not limited to those exemplified as the following embodiments and encompasses all changes made thereto within the scope of the claims and within the scope of any equivalents to the claims. The present invention also encompasses any combinations of the embodiments, as long as such combinations of different embodiments are valid.

Figure 2:
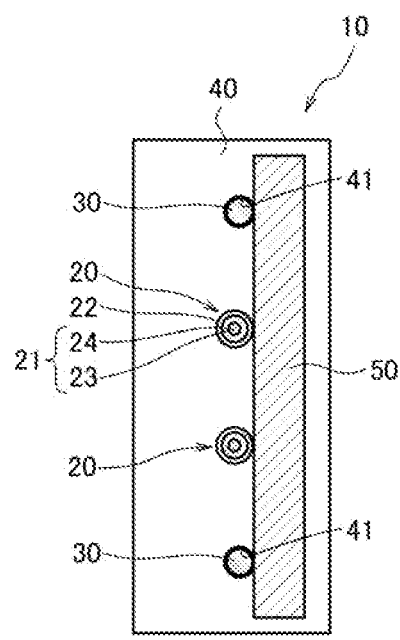
FIG. 2 is a sectional view of the optical connection component illustrated in FIG. 1, taken along line A-A.

First, a configuration of the optical connection component will be described. FIG. 1 is a plan view of an exemplary optical connection component according to the present disclosure. FIG. 2 is a sectional view of the optical connection component illustrated in FIG. 1, taken along line A-A.

As illustrated in FIG. 1, an optical connection component 10 includes optical fibers 20, line members 30, a first securing member 40, and a second securing member 50.

Each optical fiber 20 serves as a transmission line that transmits light. The optical fiber 20 includes a glass fiber 21 and a resin coating layer 22 covering the glass fiber 21. The optical connection component 10 may include one or a plurality of optical fibers 20. The present embodiment concerns a case where the optical connection component 10 includes two optical fibers 20. The optical fiber 20 may be an optical-fiber ribbon obtained by covering a plurality of glass fibers 21 arranged parallel to one another with a common coating layer. The optical fiber 20 may include a single core or a plurality of cores. In the present disclosure, the term "optical fiber" refers to the one obtained by covering the glass fiber 21 with the coating layer 22. Alternatively, the entirety or part of the glass fiber of the optical fiber may be exposed without being covered with the coating layer 22.

As illustrated in FIG. 2, the glass fiber 21 includes, for example, at least one core 23 made of quartz-based glass, and cladding 24 provided around the core 23 and having a lower refractive index than the core 23.

Referring to FIG. 1, the line members 30 are arranged in parallel with the optical fibers 20. The line members 30 have a lower elastic limit and are easier to undergo plastic deformation at room temperature than the optical fibers 20. The optical connection component 10 may include one or a plurality of line members 30. The present embodiment concerns a case where the optical connection component 10 includes two line members 30, with the optical fibers 20 being positioned between the two line members 30. The material of the line members 30 is not specifically limited to and may be, for example, a metal material such as stainless steel; iron; copper; or aluminum, or a resin material such as plastic. In terms of having a lower elastic limit and being easier to undergo plastic deformation at room temperature, the material of the line members 30 is preferred to be a metal material. In terms of being easy to bend, the material of the line members 30 is more preferred to be stainless steel, iron, or copper. In terms of being difficult to rust and being light, the material of the line members 30 is much more preferred to be stainless steel. The outside diameter of the line members 30 is not specifically limited to but is preferred to be smaller than or equal to the outside diameter of the glass fibers 21, in terms of being easy to insert together with the glass fibers 21 into the first securing member 40.

The first securing member 40 is a member that secures one-end portions of the optical fibers 20 and one-end portions of the line members 30. The first securing member 40 is, for example, a capillary member made of glass and having capillaries 41 so that the coefficient of thermal expansion thereof matches that of the glass fibers 21. Specifically, the first securing member 40 has, for example, a block-like shape (a square-pole shape) with, for example, four capillaries 41 extending therethrough from one face to the other face opposite the one face.

The capillaries 41 receive the one-end portions of the line members 30 and the one-end portions of the optical fibers 20 that are individually inserted thereinto and secured therein. The one-end portions of the optical fibers 20 are free of the coating layers 22, with the respective glass fibers 21 exposed. The inside diameter of the capillaries 41 is greater than the outside diameter of the glass fibers 21. Therefore, when the glass fibers 21 are inserted into the capillaries 41, the glass fibers 21 have some play therein and are positioned in such a manner as to be movable back and forth. The first securing member 40 and the glass fibers 21 are secured to each other with glass adhesive that is fed into gaps around the glass fibers 21 in the capillaries 41 by the effect of capillarity.

The second securing member 50 is a member that adhesively secures the optical fibers 20 and the line members 30 with adhesive 60 on a side thereof near the other-end portions of the line members 30. The second securing member 50 is not specifically limited to but is, in the present embodiment, a plate member extending from the first securing member 40 in the axial direction of the optical fibers 20. The plate member spreads over a plane of parallel arrangement of the optical fibers 20 and the line members 30 and is plastically deformable together with the line members 30. The material of the plate member may be a metal material or a resin material. The above second securing member 50 is secured to the first securing member 40 and/or the one-end portions of the optical fibers 20 and the line members 30. In the present embodiment, an end face of the plate member as the second securing member 50 is adhesively secured to the first securing member 40.

Figure 3A:
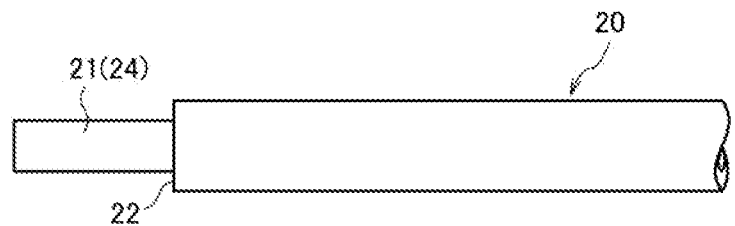
FIG. 3A is a side view of an exemplary optical fiber to be included in the optical connection component according to the present disclosure.

Now, a method of manufacturing the optical connection component 10 will be described. FIG. 3A is a side view of an exemplary optical fiber to be included in the optical connection component according to the present disclosure. As illustrated in FIG. 3A, the manufacturer prepares, for example, two optical fibers 20 and removes the coating layer 22 from a one-end portion of each of the optical fibers 20, whereby the cladding 24 is exposed. In the present disclosure, "manufacturer" may be interchangeable with "manufacturing apparatus".

Figure 3B:
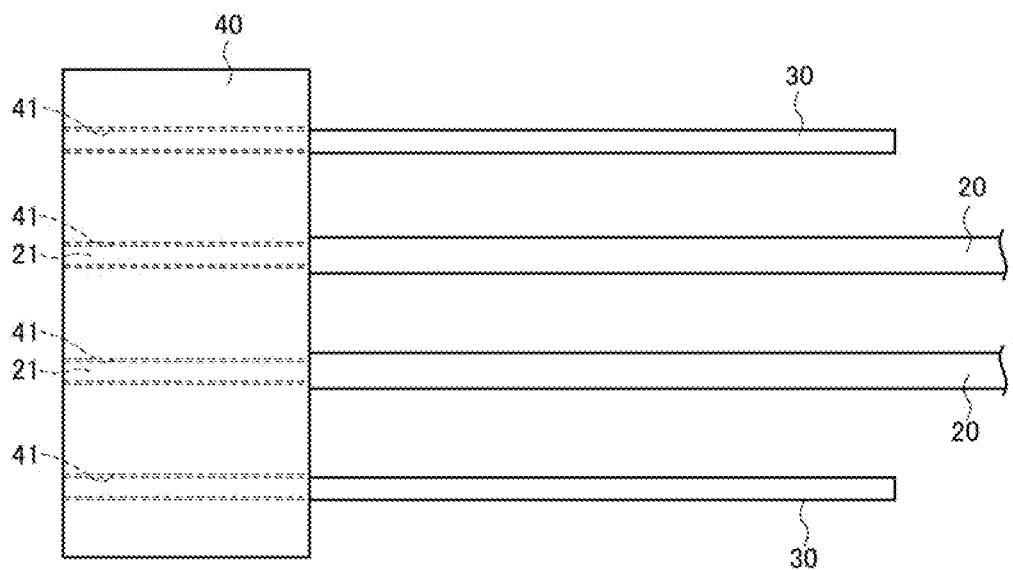
FIG. 3B is a plan view of a state where optical fibers and line members are secured to a first securing member in a step included in a method of manufacturing the optical connection component.
Figure 3C:
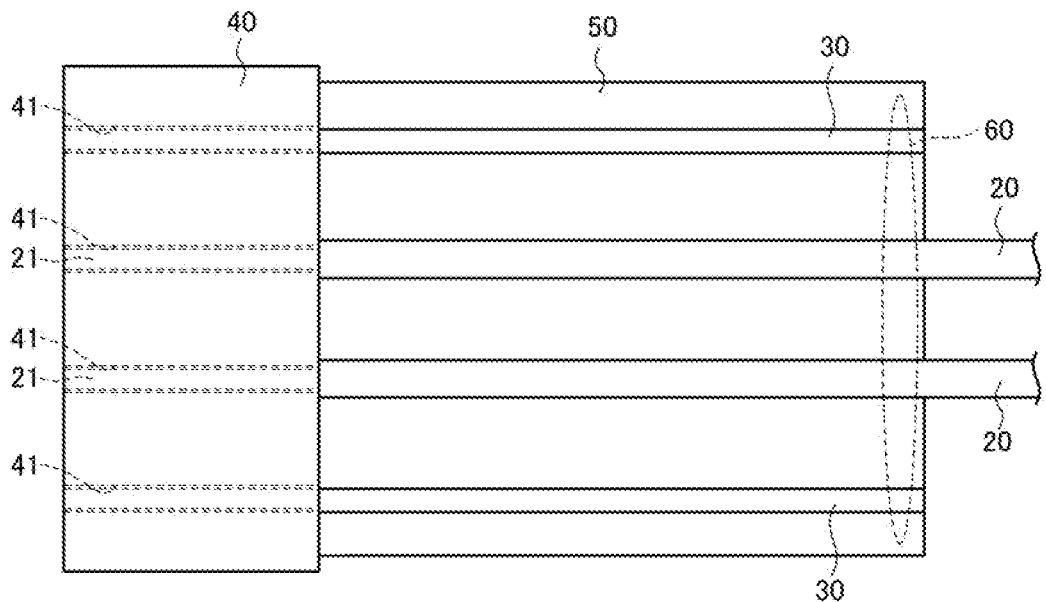
FIG. 3C is a plan view of a state where a second securing member is secured the optical fibers in a step included in the method of manufacturing the optical connection component.
Figure 3D:
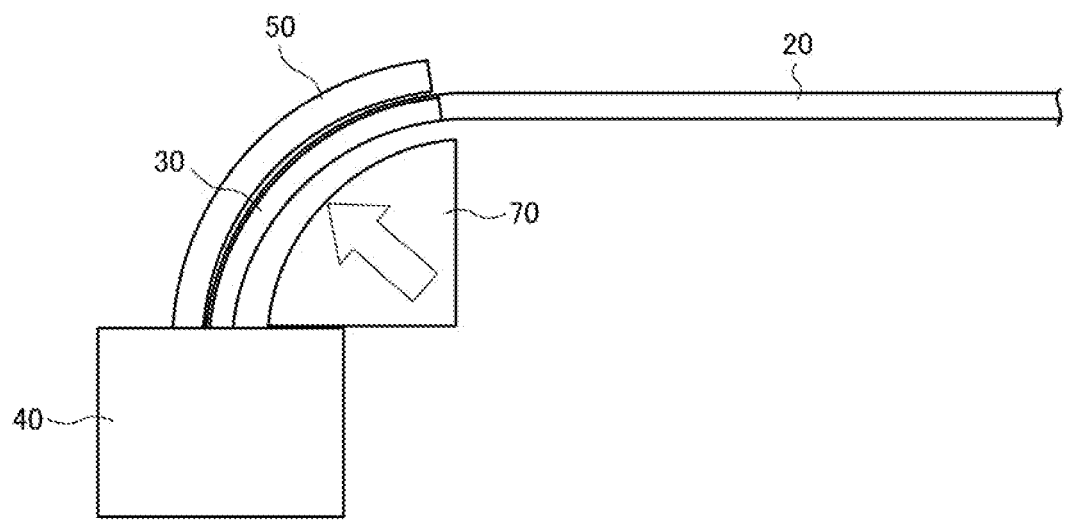
FIG. 3D is a side view of a state in a step included in the method of manufacturing the optical connection component.

FIGS. 3B to 3D are diagrams illustrating respective steps included in the method of manufacturing the optical connection component. As illustrated in FIG. 3B, the manufacturer prepares, for example, two line members 30. Subsequently, the manufacturer inserts one-end portions of the two optical fibers 20 and one-end portions of the two line members 30 into the first securing member 40 and secures them. Subsequently, the manufacturer polishes an end face of the first securing member 40, end faces of the one-end portions of the optical fibers 20, and end faces of the one-end portions of the two line members 30, whereby the end face of the first securing member 40 is regarded as an optical-connection-component end.

Subsequently, as illustrated in FIG. 3C, the manufacturer adhesively secures the second securing member 50 to another end face of the first securing member 40, and portions (for example, middle portions) of the optical fibers 20 and the other-end portions of the line members 30 are adhesively secured to a surface of the second securing member 50 with adhesive 60.

Subsequently, as illustrated in FIG. 3D, the manufacturer prepares, for example, a stick-like jig 70 including an arc portion having a desired curvature, and positions the optical fibers 20 and the line members 30, extending from the first securing member 40, along the arc portion of the jig 70. Subsequently, the manufacturer bends portions of the line members 30 that are near the first securing member 40 toward the jig 70 and presses the line members 30 against the jig 70. Thus, the manufacturer applies an external force to the optical fibers 20 and the line members 30, especially to the line members 30, in the radial direction, thereby plastically deforming the optical fibers 20 and the line members 30. Consequently, the bends in the line members 30 are retained, and the force of retaining the bends is transmitted to the optical fiber 20 through the second securing member 50, whereby the bends in the optical fibers 20 are also retained.

To summarize, the optical connection component 10 according to the embodiment of the present disclosure includes the optical fibers 20; the one or plurality of line members 30 arranged in parallel with the optical fibers 20, the line members 30 having a lower elastic limit and being easier to undergo plastic deformation at room temperature than the optical fibers 20; the first securing member 40 as the block having the plurality of capillaries 41 extending parallel to one another or as a combination of a V-grooved board 42 and a flat board 43, the V-grooved board 42 having the plurality of V-grooves 44 extending parallel to one another, the first securing member 40 securing the one-end portions of the optical fibers 20 and the one-end portions of the one or plurality of line members 30 individually in the plurality of capillaries 41 or in the plurality of V-grooves 44; and the second securing member 50 that secures the optical fibers 20 and the one or plurality of line members 30 on the side of the second securing member 50 near the other-end portions of the one or plurality of line members 30.

In such a configuration, when the line members 30 are bent and plastically deformed, the optical fibers 20 secured to the second securing member 50 together with the line members 30 can be retained in the bent state. Thus, the optical connection component 10 capable of retaining the optical fibers 20 that are bent with a desired curvature can be obtained, with neither a board having a predetermined curved surface nor a member having a curved hole.

Modifications

The present invention is not limited to the above embodiment. That is, embodiments obtained through any design changes made to the above embodiment by those skilled in the art are included in the scope of the present invention, as long as the features of the present invention are employed. Furthermore, elements employed in the above embodiment and the following modifications may be combined in any way, as long as such combinations are technically valid. The combinations are also included in the scope of the present invention, as long as the features of the present invention are employed.

For example, the above embodiment concerns a case where two optical fibers 20 and two line members 30 are prepared. Alternatively, for example, two optical fibers 20 and one line member 30 may be prepared. In the latter case, the line member 30 may be positioned between the optical fibers 20.

Furthermore, the above embodiment concerns a case where the first securing member 40 has a block-like shape. Alternatively, the first securing member 40 may have another shape.

Figure 4:
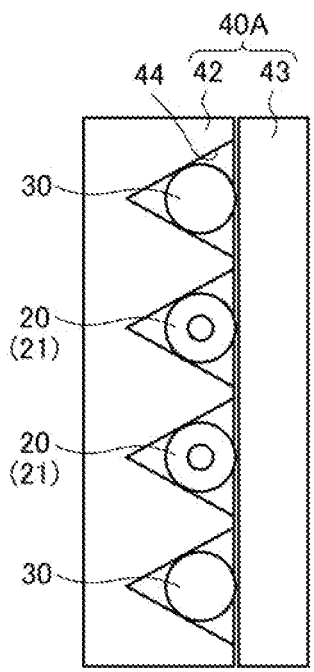
FIG. 4 is a front view of a modification of the first securing member included in the optical connection component according to the present disclosure.

FIG. 4 is a front view of a modification of the first securing member included in the optical connection component according to the present disclosure.

As illustrated in FIG. 4, a first securing member 40A includes a V-grooved board 42 made of glass, and a flat board 43 also made of glass. The V-grooved board 42 has, for example, four V-grooves 44, each of which has such a size as to receive the glass fiber 21. The flat board 43 has a flat surface of such a size as to cover all the V-grooves 44 provided in the V-grooved board 42. The glass fibers 21 are secured in the respective V-grooves 44 of the V-grooved board 42. In this case, the flat board 43 and the glass fibers 21 are secured to the V-grooved board 42 with glass adhesive.

The above embodiment concerns a case where the second securing member 50 is a plate member. Alternatively, the second securing member may secure the other-end portions of the optical fibers 20 and the other-end portions of the line members 30 and have the same shape as the first securing member.

Figure 5:
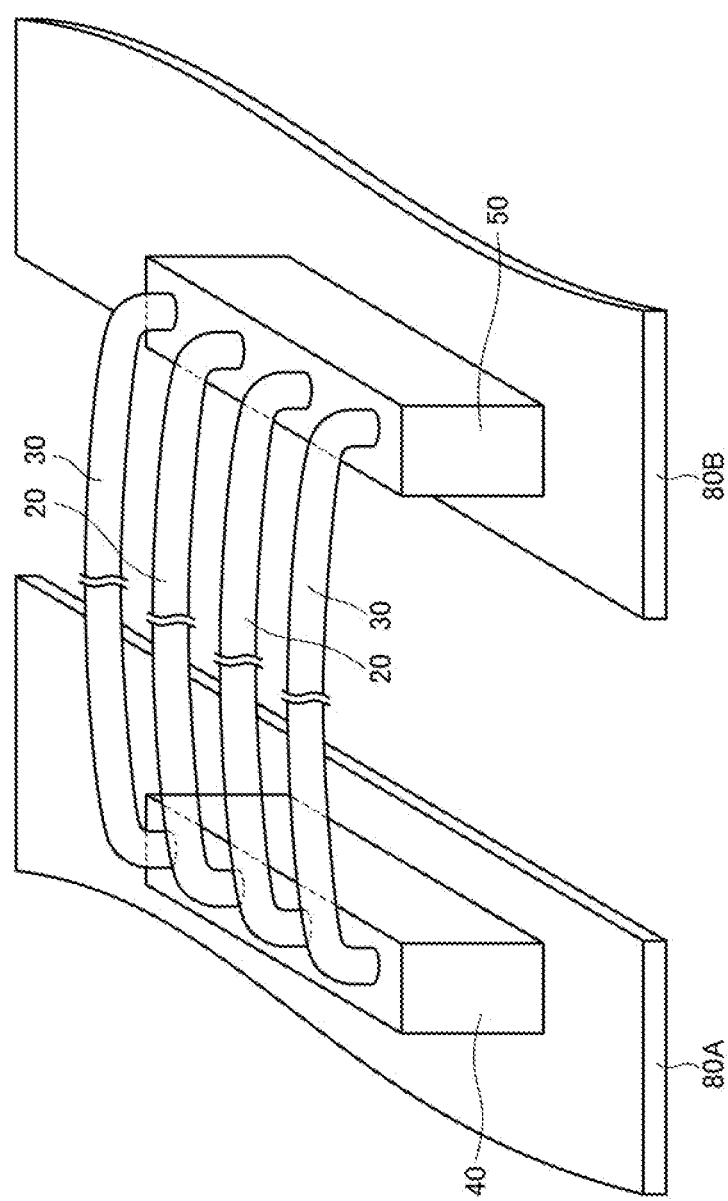
FIG. 5 is a perspective view of an exemplary optical connection component according to the present disclosure that includes a second securing member having the same shape as a first securing member.

FIG. 5 is a diagram illustrating another exemplary optical connection component according to the present disclosure that includes a second securing member having the same shape as a first securing member.

As illustrated in FIG. 5, the first securing member 40 is connected to one board 80A, and the second securing member 50 is connected to another board 80B. The second securing member 50 has the same configuration as the first securing member 40 and secures the other-end portions of the optical fibers 20 and the other-end portions of the line members 30. In such a configuration, the necessity of separately preparing a plate member as the second securing member 50 is omitted.

REFERENCE SIGNS LIST

| | | | | |
|---|---|---|---|---|
| 10 | optical connection component, | | 20 | optical fiber, |
| 21 | glass fiber, | 22 coating layer, | 23 | core, |
| 24 | cladding, | 30 line member, | 40 | first securing member, |
| 40A | first securing member, | | 41 | narrow hole, |
| 42 | V-grooved board, | 43 flat board, | 44 | V-groove, |
| 50 | second securing member, | | 60 | adhesive, |
| 70 | jig, | 80A board, | 80B | board |

What is claimed is:

1. An optical connection component comprising:

an optical fiber;

one or a plurality of line members arranged in parallel with the optical fiber, the one or plurality of line members having a lower elastic limit and being easier to undergo plastic deformation at room temperature than the optical fiber;

a first securing member as a block having a plurality of capillaries extending parallel to one another or as a combination of a V-grooved board and a flat board, the V-grooved board having a plurality of V-grooves extending parallel to one another, the first securing member securing a one-end portion of the optical fiber and one-end portions of the one or plurality of line members individually in the plurality of capillaries or in the plurality of V-grooves; and a second securing member that secures the optical fiber and the one or plurality of line members on a side near other-end portions of the one or plurality of line members.

2. The optical connection component according to claim 1, wherein the second securing member adhesively secures the optical fiber and the one or plurality of line members on the side near the other-end portions of the one or plurality of line members.

3. The optical connection component according to claim 1, wherein the one or plurality of line members include two line members, and wherein the optical fiber is positioned between the two line members.

4. The optical connection component according to claim 3, wherein the second securing member is a plate member that spreads over a plane of parallel arrangement of the optical fiber and the two line members and is plastically deformable together with the two line members.

5. The optical connection component according to claim 4, wherein the plate member is secured to the first securing member or to the one-end portions of the optical fiber and the two line members.

6. The optical connection component according to claim 1, wherein the second securing member is a block having a plurality of second capillaries extending parallel to one another or a combination of a V-grooved board and a flat board, the V-grooved board having a plurality of second V-grooves extending parallel to one another, the second securing member securing an other-end portion of the optical fiber and the other-end portions of the one or plurality of line members individually in the plurality of second capillaries or in the plurality of second V-grooves.

* * * * *